May 11, 1954  F. C. KOCH  2,678,199
GAS-LIQUID CONTACT APPARATUS
Filed July 12, 1950  4 Sheets-Sheet 1
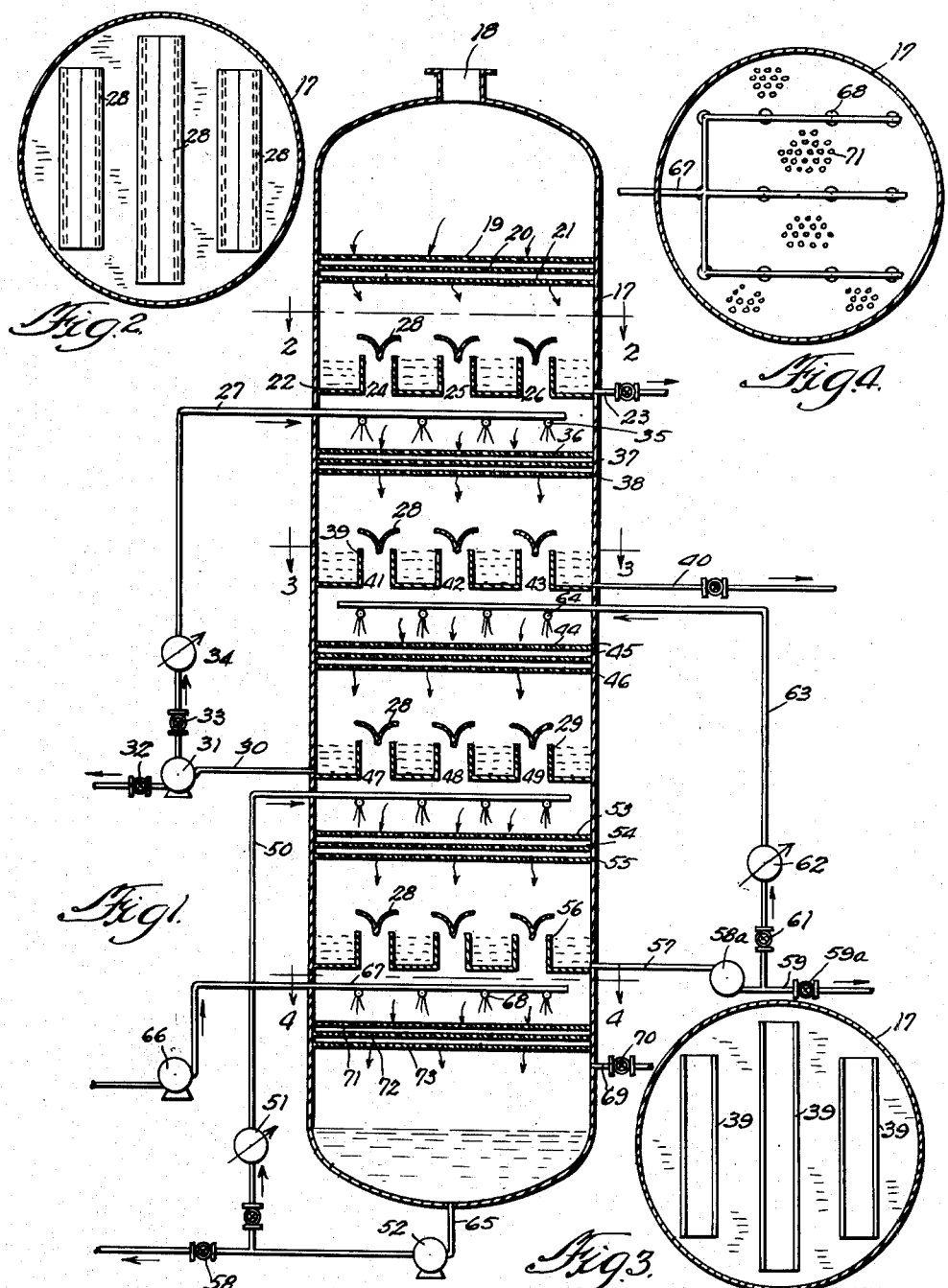
INVENTOR.
Fred C. Koch.
BY
Thiess, Olson & Mecklenburger
Attys.

May 11, 1954  F. C. KOCH  2,678,199
GAS-LIQUID CONTACT APPARATUS
Filed July 12, 1950  4 Sheets-Sheet 2
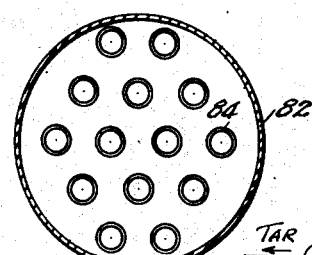
Fig. 6.
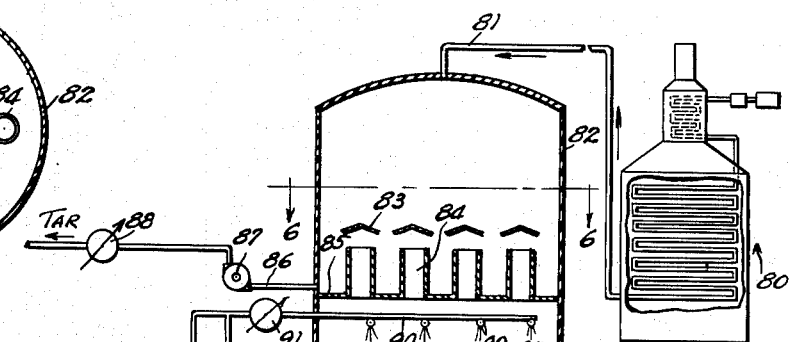
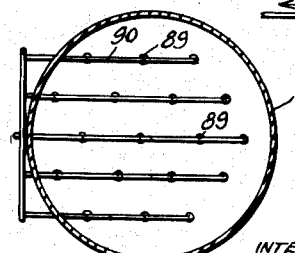
Fig. 7.
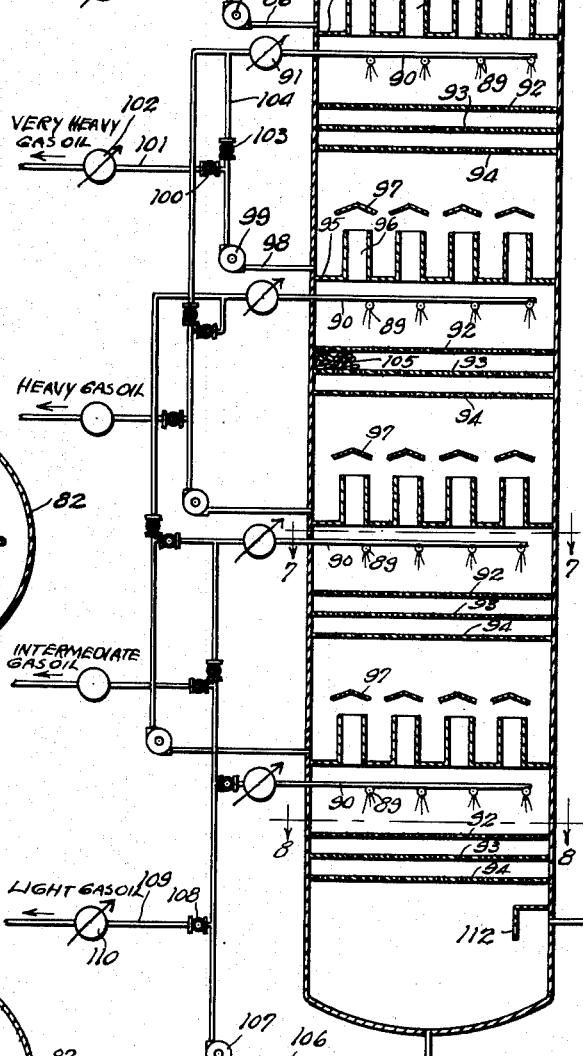
Fig. 5.
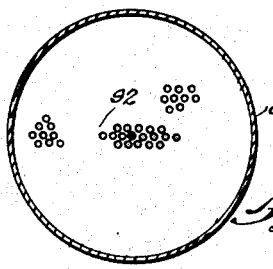
Fig. 8.
INVENTOR.
Fred C. Koch.
BY
Thies, Olson & Mecklenburger
Attys.

May 11, 1954     F. C. KOCH     2,678,199
GAS-LIQUID CONTACT APPARATUS
Filed July 12, 1950     4 Sheets-Sheet 3
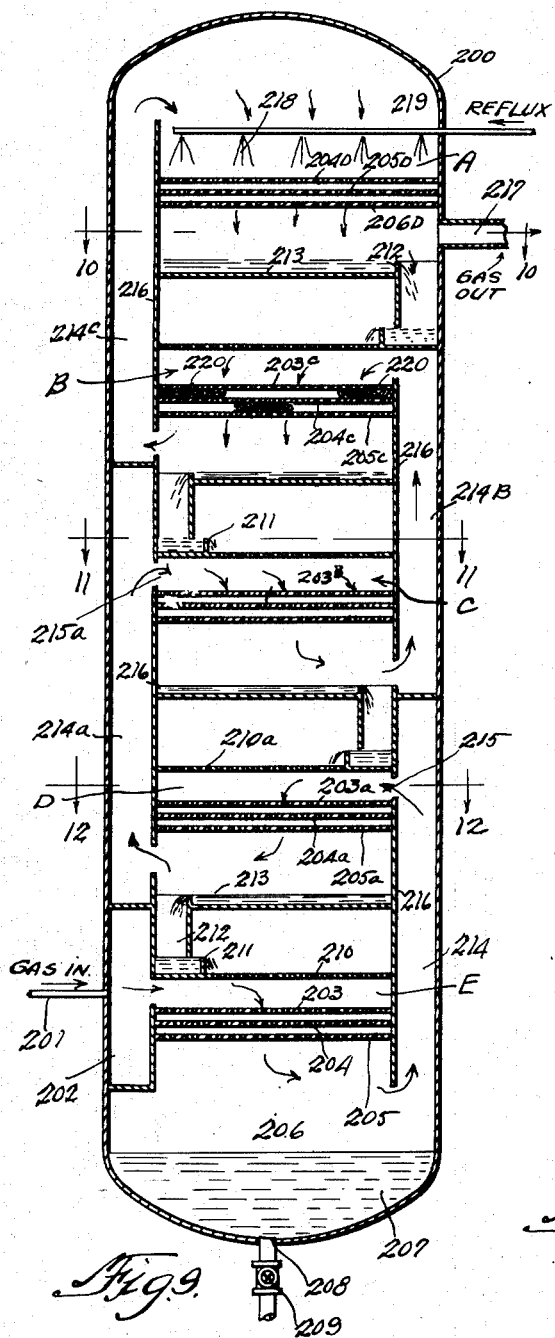
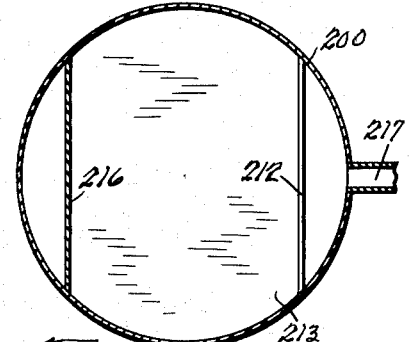
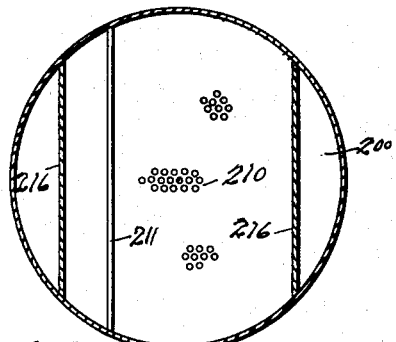
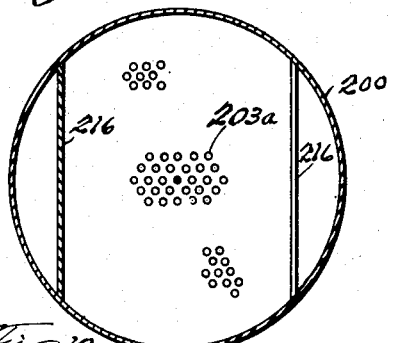
INVENTOR.
Fred C. Koch

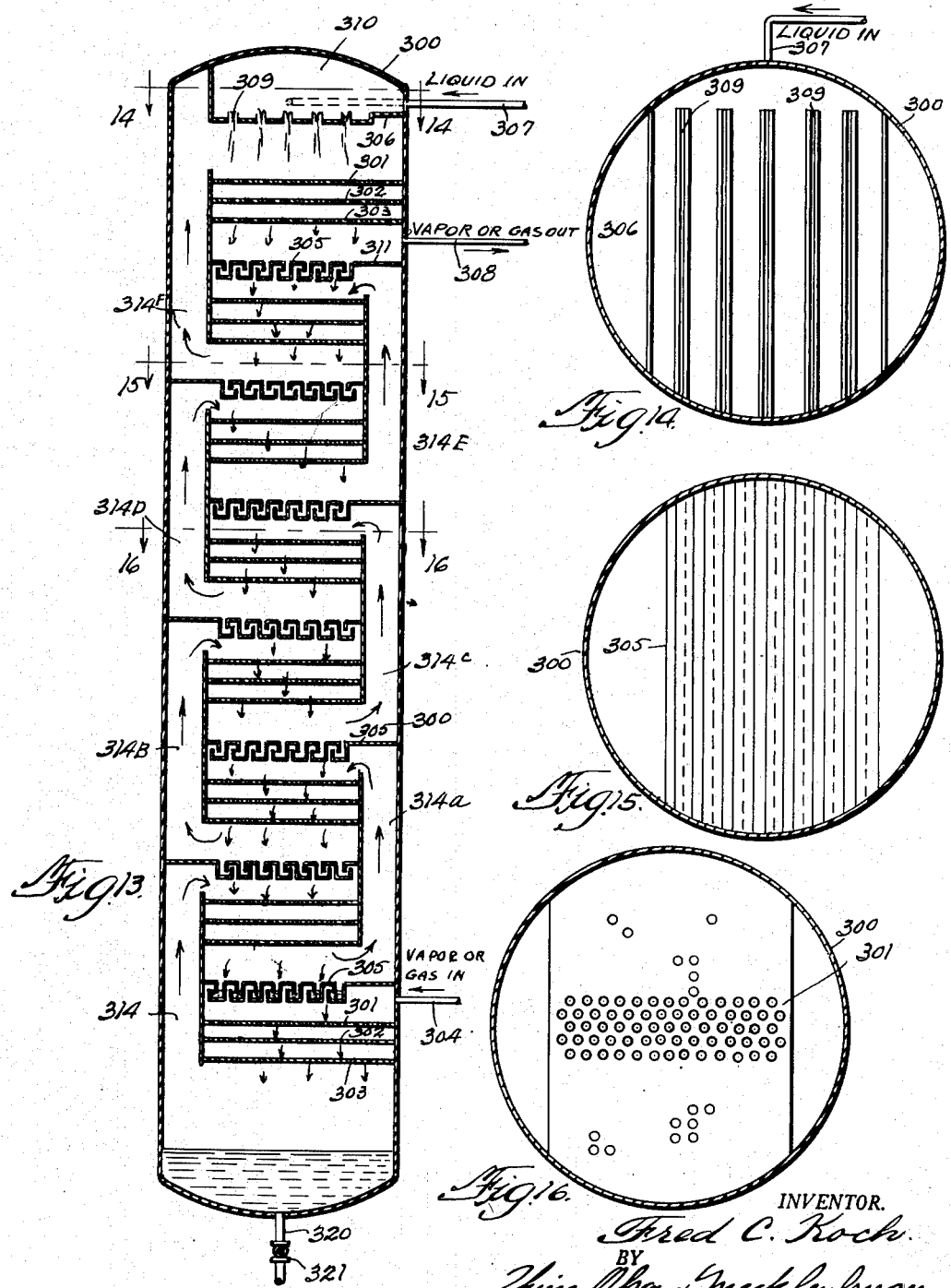

Patented May 11, 1954

2,678,199

UNITED STATES PATENT OFFICE 2,678,199

GAS-LIQUID CONTACT APPARATUS

Fred C. Koch, Wichita, Kans., assignor to Koch Engineering Company, Inc., Wichita, Kans., a corporation of Kansas Application July 12, 1950, Serial No. 173,308

5 Claims. (Cl. 261—22)

The present invention relates to improved process and apparatus for effecting intimate contact between gases and liquids.

The invention has particular applicability to the dephlegmation of vapors such as are encountered in various distillatory processes. In addition it is applicable to such known practices or arts as contacting steam with water to effect the condensation of steam, or contacting air with water to effect heating or cooling or humidification or dehumidification, depending on the conditions of the operation. It is also applicable to the absorption of gases in water or other absorbing liquids, washing solids such as dust out of gases, etc.

The present invention is fundamentally predicated upon the principle of obtaining better contact between gas and liquid in order that there may be obtained, as is commonly known within the art, better mass transfer as characterized by more intimate contact between gases and liquids, as for example, in a dephlegmator or other gas-liquid exchange device. In particular, this invention relates to securing the benefits of intimate mixing at a low pressure-drop and a relatively high efficiency of contact, together with securing greatly increased capacity in a column of given diameter, by causing the liquid and vapors to move in a concurrent manner, and while in such motion to impinge upon suitably arranged mechanisms so as to cause good and intimate mixing between the gas and liquid phases. Perforated plates, which are old in the art of dephlegmation, may be used as one contacting means. Other mechanisms could be Raschig rings, Berl saddles, crushed stones, rocks, or other media commonly used in distillatory practice.

In the usual arrangement of a fractionating tower wherein perforated plates, or packing such as described above are used, the gas flows essentially upwardly through the tower and the liquid flows downwardly through the packing or downwardly and laterally across perforated plates and then from plate to plate. Contacting occurs as the vapor flows upwardly through the essentially downflowing liquid. In particular in a tower equipped with perforated plates, the size and number of perforations must be carefully calculated for the designed vapor and liquid loads. The resulting design of tower will operate only over a relatively narrow range of conditions. If the operating conditions are changed beyond the established range, the intimacy of contact between the gas and liquid will decrease and the operation of the tower will be poor.

By contrast, in the present invention the vapor and liquid are caused to flow concurrently downwardly through the perforated plates or packing used as the contacting means. This is the reverse of the method in general use wherein the method of dephlegmating vapors, or contacting gases with liquids, has involved passing the gases upwardly through the downflowing liquid in what is known as a bubble tower, perforated tray tower, or packed tower. In all such mechanisms, as the vapor load increases, entrainment from deck to deck or section to section increases, thus lowering the efficiency of each deck. The conventional bubble cap deck, perforated tray, or packed tower may become inoperative when the vapor velocity within the tower becomes so great that it causes coning or blowing of the liquid away from the caps of a bubble deck, or the holes of a perforated tray, or off the solid or wire material of a packed tower. Alternately the gas pressure drop from plate to plate becomes so great that the available pressure to force the liquid downwardly is overcome so that the liquid cannot flow downwardly and the tower floods.

It is therefore one of the major objects of the present invention to provide a gas-liquid contact tower in which the pressure drop is kept to a minimum.

It is a further object to provide a gas-liquid contact tower which may be operated at a relatively high vacuum without loss in contacting or dephlegmating efficiency.

It is a further object to provide efficient means for contacting gases or vapors with liquids while both are traveling in the same, rather than counter-current, relationship.

It is a still further object to provide means for modifying the temperature of the liquid between various contacting stages or areas.

A still further object of this invention is the provision of a concurrent flow contacting process and apparatus including a foraminous support such as a perforated tray in which gas and liquid may be effectively passed therethrough in a downward direction.

Still further objects of the invention will become manifest from the more detailed description hereinbelow.

By means of the apparatus herein described the liquid and vapor are mixed to flow in the same direction, each phase assisting the other to move downwardly. In this way the pressure loss of the vapors across each plate helps to force the liquid downwardly along with them rather than hindering the flow. This vapor pressure drop, therefore, helps the flow of liquid so that as a result thereof the capacity of the tower, for a certain diameter, becomes greater than that of any other known contacting device, and at a pressure loss not known in any presently known devices. When using concurrent vapor and liquid flow in accordance with this invention, the size of perforations in a perforated plate column becomes important as does the volume of liquid circulated through the apparatus. For example, liquid should be recirculated in the device to insure proper gas-liquid contact, particularly in oil fractionating processes. Also in such processes the size of the perforations should be between about ⅛ and ½ inch in diameter in order to obtain good concurrent flow contact of the gas and liquid.

In the preferred practice of the present invention the liquid is introduced above a number of perforated plates. Vapor or gas is introduced substantially at the same level as the liquid and both flow downwardly through a series of perforated plates which may be one or more, spaced at a distance up to 12 inches apart. Spacing of the perforated plates is not critical, but may normally range from about 1 inch to 6 inches. In some embodiments of the present invention the vapor is turned upwardly into the tray above, using conducting means either inside or outside of the tower. In further embodiments the vapor continues downwardly through the tower.

One of the chief advantages of this design is the extremely low pressure drop experienced in the contacting. Pressure drops as low as 0.1 of an inch of water have been obtained per set of three (3) perforated plates at substantial liquid and vapor loads.

The characteristic of low pressure drop is particularly valuable in vacuum distillation, where vacuum is employed to dephlegmate materials very sensitive to heat. It then becomes necessary to employ the highest vacuum possible in order to maintain the distilling temperature at as low a point as possible. For commercial installation the pressure drop through the best designed bubble tray, or other vapor-liquid contacting device under ideal conditions is generally greater than 1 inch of water. Since several such contacting devices are used in series, the total pressure drop may reach 10 to 20 inches of water or more. In contrast, the pressure drop through the contacting towers of the present invention may be only on the order of 1 to 2 inches of water.

Another major advantage of the improved towers of the present invention is the ability to handle both vapor and liquid loads far greater than can be handled by presently known dephlegmating devices, without losing efficiency or becoming inoperative. Moreover, excellent contact is achieved even at low capacities of vapor or liquid, or both. Thus the present invention assures a contacting device which operates efficiently over a very wide range of capacities.

The present invention is illustrated by four different embodiments, shown on four sheets of drawings, in which:

Fig. 1 is a vertical section through the center of a tower constructed in accordance with one embodiment of the invention;

Fig. 2 is a horizontal cross-section along the line 2—2 of Fig. 1, looking downwardly;

Fig. 3 is a similar cross-section along the line 3—3 of Fig. 1;

Fig. 4 is a similar cross-section along the line 4—4 of Fig. 1;

Fig. 5 is a vertical section through the center of a modified form of tower of the type useful for fractionation;

Fig. 6 is a cross-section looking downwardly, along the line 6—6 of Fig. 5;

Fig. 7 is a similar cross-section along the line 7—7 of Fig. 5;

Fig. 8 is a similar cross-section along the line 8—8 of Fig. 5;

Fig. 9 is a vertical section through the center of another form of tower constructed in accordance with the present invention;

Fig. 10 is a cross-section, looking downwardly through the tower shown in Fig. 9, along the line 10—10 of said figure;

Fig. 11 is a similar cross-section along the line 11—11 of Fig. 9;

Fig. 12 is a similar cross-section along the line 12—12 of Fig. 9;

Fig. 13 is a vertical section through still a further modification of the towers constructed in accordance with the present invention;

Fig. 14 is a cross-section, looking downwardly, along the line 14—14 of Fig. 13;

Fig. 15 is a similar cross-section along the line 15—15 of Fig. 13; and

Fig. 16 is a similar cross-section along the line 16—16 of Fig. 13. The last three figures are on a somewhat enlarged scale.

One embodiment of the present invention is shown in Fig. 1, which illustrates a vacuum tower designed for fractionation and direct condensation of vapors, using three perforated plates per contacting stage. The total number of contacting stages is five. A mixture of vapor and liquid, as from a topped crude oil heater, is admitted to the top of the column 17 through line 18. The mixture passes over the first set of three perforated plates 19, 20 and 21, where intimate contact is had between vapor and liquid in the first dephlegmating step, and equilibrium is established. The vapor and liquid flow downwardly, liquid being trapped on deck 22 from where it may be withdrawn through line 23. Uncondensed vapor, however, continues downwardly through openings 24, 25 and 26 where it meets fresh liquid, which enters through line 27 of a lower average boiling point than that which was admitted through line 18 and withdrawn through line 23. Baffles 28 cover openings 24, 25 and 26 to prevent liquid from being entrained with the vapors. The liquid entering line 27 is pumped from the second lower deck or collecting pan 29 through line 30 by means of pump 31. Part of the liquid, the exact amount of which is generally determined by actually operating the tower, is withdrawn from the discharge of pump 31, through valve 32, the remainder of the liquid being then pumped through valve 33 through cooler 34, and into line 27. The vapor entering from line 18, and the cooled liquid entering the tower through line 27 and broken up into sprays by liquid distributors 35, are contacted on perforated plates 36, 37, and 38, so that a second dephlegmating step occurs. The dephlegmating liquid which entered through line 27 is trapped on deck 39 and withdrawn through line 40. The vapor then passes downwardly through openings 41, 42 and 43 onto plates 44, 45 and 46. The vapor is mixed with a spray of liquid from a lower collecting zone circulated through pipe 63 and sprayers 64. The further dephlegmated vapor flows downwardly through openings 47, 48 and 49, where it contacts fresh liquid entering through line 50, from reflux cooler 51, and pump 52. The resulting mixture of vapor and liquid flows through perforated plates 53, 54, and 55, and the liquid is trapped on deck or plate 56 and withdrawn through pipe 57. The net product, accumulating in the bottom of tower 17, is pumped to storage through valve 58 by means of pump 52 while the desired amount of liquid reflux flows through cooler 51 and returns to the tower through line 50.

Liquid withdrawn from deck 56 through the line 57 is pumped by means of pump 59A either out of the apparatus through line 59 and valve 59A, or partly or entirely, as desired, through valve 61, cooler 62 and line 63 back into the tower, being broken up into a spray by sprayers 64. This procedure can be continued for any number of steps; the three steps illustrated above being simply representative of the method. When the vapor and liquid have passed through the desired number of steps including the bottom deck or tray 56, the liquid is separated from the vapor and withdrawn through line 65, and in part recycled, as explained. Sufficient cooling is provided by coolers to effect final dephlegmation of all dephlegmatable hydrocarbon vapors. Initial reflux is introduced by pump 66 from an outside source, and distributed by pipe 67 and sprays 68. Noncondensable gases, including air plus steam which may have been admitted to either the furnace or top of the tower to assist in vaporization, pass through line 69 and valve 70 to the vacuum producing equipment. There is a final set of three perforated plates 71, 72 and 73.

An important feature of this invention is based upon the discovery that good contact between the liquid and vapor can be secured by passing them together and concurrently through a perforated plate. The operating range of sizes of the perforations in commercial practice for oil fractionation lies between about ⅛ and ½ inch diameter. It is also important that an adequate amount of liquid relative to vapor be used, in order that liquid and vapor simultaneously pass through the perforations. For this reason the recirculation of material which has gone through the apparatus once is practiced whereby to regulate the ratio of liquid to vapor.

The above described embodiment of the present invention as shown in Fig. 1, although shown for vacuum work, may be used in any dephlegmation problem or for any other vapor-liquid contacting requirement.

The form of the present invention particularly adapted to fractional condensation of vapors coming from any suitable type of oil heating still is illustrated in Figs. 5, 6, 7 and 8. Vapors produced in oil still 80 enter through vapor line 81 into the top of tower 82 where they first encounter baffles 83 which shield pipes or passageways 84 through which vapors pass into further parts of the tower, while any liquid not vaporized, such as tar, collects on uppermost deck 85 and is pumped out through line 86 by means of pump 87 and to storage through cooler 88.

The vapors which pass through the openings 84 encounter liquid sprayed into the tower through spray-heads 89 located on a multiple of pipes 90 which are connected with suitable supply lines as hereinafter further described. This liquid, which is of a heavy gas oil type, is cooled by a cooler 91. As it leaves sprays 89, it mixes with the vapor passing through openings 84, the resulting mixture passing downwardly through a set of perforated plates 92, 93 and 94, where very intimate contact between vapors and liquids is effected, whereby further condensation takes place. As both the vapors and liquid pass downwardly, instead of upwardly, a much greater volume of both liquid and vapors can be accommodated. The resulting condensate drops down and collects upon a second deck 95 which is just like deck 85, the openings 96 therein being protected by baffles 97. Still uncondensed vapors hence pass through the openings 96 to the next lower contacting section. Such liquid as condenses is withdrawn through line 98 and pumped by pumps 99 either entirely out of the apparatus through valve 100, line 101, and cooler 102, or partly through valve 103, line 104 and cooler 91 back into the apparatus through the aforementioned line 90 and sprays 89.

This action of the tower repeats itself in subsequent lower decks in exactly the same manner, with the formation of lower and lower boiling condensates, which are circulated back or partly withdrawn, as indicated by the legends on the drawings, so that a detailed description would be merely repetitious. The perforated plates may be any desired distance apart, as from 3 to 12 inches, or even more, and, if desired, a suitable filling or contacting material 105 may be placed on the plates or between them, as indicated in connection with the second lower deck of perforated plates 92, 93 and 94. Such filling material may be of the nature of Raschig rings, Berl saddles, metal wool, pebbles or the like. The lightest condensate such as a light gas oil is withdrawn from the bottom of the tower 82 through line 106 and pumped by pump 107 to whatever deck it may be decided to return it to, all or in part; or all of it may be withdrawn from the system through valve 108, line 109 and cooler 110. Valve and connections are clearly indicated on the drawings, and as the exact operation depends upon the characteristics of the oil being put through the apparatus, a detailed operation need not be described.

The desired pressure or vacuum conditions are maintained in the apparatus by pulling residual vapors and uncondensable gases out of the apparatus through the pipe 111, a suitable baffle 112 shielding the inlet of the pipe 111 from free liquid.

This type of tower permits excellent and accurate control of the dephlegmation, as the volume and temperature of the reflux is always adjustable as desired by the operator. The outstanding feature is that the vapors as well as the liquid while in exchange relationship always travel in the same direction, while the liquid, when being elevated from a lower to a higher deck, is out of contact with the vapor and subject to temperature control. Thus while the symbols for coolers (such as 102) are shown, these may actually be used to raise the temperature of the liquid passing therethrough.

A further embodiment of the present invention is illustrated by Figs. 9, 10, 11 and 12, in which a tower is used in which, while the gas or vapor enters at the bottom and eventually leaves near the top, and liquid courses successively downwardly through a number of superposed contacting sections, the flow of gases and liquids while in contact, is always concurrent, and, in this case, also downwardly. As this type of tower is particularly useful in the treatment of relatively noncondensable gases with liquids, it will be described as a gas-liquid contact device, such as may be used to wash or humidify gases, remove dust, absorb soluble gases or vapors, etc. etc.

Thus within a housing 200 there are positioned a plurality of gas-liquid contacting sections broadly designated as A, B, C, D, and E, section E being the lowest in the apparatus. Internal gas-passageways connect the various sections, while liquid collects on imperforate decks and flows through downcomers to perforated distributing plates.

As shown in Fig. 9, and describing the operation from the entry of the gas at the bottom into section E through pipe 201, the gas first passes into internal gas-passageway 202 and thence downwardly through the set of contact plates 203, 204 and 205 into space 206 in the bottom of which residual liquid 207 collects, being withdrawable from the apparatus through pipe 208 and valve 209.

During its passage through plates 203, 204 and 205, the gas is contacted with liquid rained down through it from perforated liquid-distributing plate 210 which is fed from the overflow 211 of downcomer 212, which in turn is fed by overflow from imperforate liquid collecting deck 213. The gas will not flow upwardly through the perforations in the plate 210, due to the liquid seal on downflow 212. The perforations in plates 203, 204 and 205 are about ¼ inch in diameter.

The liquid drops into the bottom of the tower to form the body of liquid 207 while the treated gas continues by passing into vertical passageway 214 to be directed into the next higher contacting section D, which it enters through opening 215. Here the gas encounters a rain of liquid dropping from another perforated liquid-distributing plate 210a (all of these plates carry the generic designation "210" plus letters, as they all function in the same manner) and passes concurrently downwardly therewith through another set of perforated contact-plates 203a, 204a, and 205a. The gas then leaves section D through vertical passageway 214a to enter section C through opening 215a, where the action is repeated. The liquid which has been in contact with the gas after passing through the perforated plates 203a, 204a and 205a, collects on imperforate plate 213, from which it overflows into downcomer 212, as already described.

As the contacting sections C and B are identical with sections D and E, they are not again described. The further vertical gas-passageways are designated as 214B and 214C. It will be noticed that these passageways are defined by the outer wall of the tower 200 and vertical partitions 216.

The gas finally leaves the apparatus through outlet pipe 217. However, it will be noticed that to get to this outlet pipe 217 it has to pass through the uppermost set of contact plates 204D, 205D and 206D. Liquid for this particular uppermost section is supplied initially in the form of a spray issuing from sprayers 218 located at suitable points on the pipe 219. This liquid may be reflux or any suitable liquid such as water, oil, acid, or alkali, depending upon the process being carried out in the equipment.

As in the other modifications, a suitable contacting or packing material 220 may be placed between the plates, as indicated in section B between plates 203c, 204c and 205c. This may take the form of Raschig rings, Berl saddles, metal wool, pebbles or the like. This particular form of apparatus is characterized by a very low pressure drop, and ease of control. As the gas and liquid, while in contact, flow in the same direction, the total volume that may be handled is quite large, and as the gas helps push the liquid through the perforations in the contact plates, the apparatus will not bind, as is often the case in counter-current gas-liquid contact devices.

A slightly different form of tower, but based on the principles of that described in connection with Figs. 9 through 12, is shown in Figs. 13, 14, 15 and 16. As the principle is exactly alike, except for the means of getting liquid from one level to the other, only one deck will be described in detail. In a tower 300, a series of upwardly leading individual gas-passageways 314 and 314A to 314F are provided. There are eight superposed contacting areas, each comprising a set of, for example, three superposed perforated plates 301, 302 and 303. Gas enters the apparatus at a point near the bottom through vapor or gas line 304 and passes downwardly through the aforementioned perforated contact plates. At the same time, liquid flows downwardly through the trap-plate 305, of which there are seven in the tower. These trap-plates permit passage of liquid downwardly, but not of gas, the pressure of the gas in the apparatus being kept low enough to prevent this. A liquid level is shown in connection with the lowermost trap plate 305, but it is to be understood that such liquid levels are present in each of the trap plates.

The initial downflow of liquid is assured by the distributing plate 306 in the top of the tower, the liquid being introduced through the pipe 307. The gas or vapor leaves the apparatus through the pipe 308. Residual liquid leaves the apparatus through pipe 320 and valve 321 at the bottom.

The flow of gases or vapors is shown by large arrows, that of liquid by small arrows. It will be seen that in this modification the flow of the gases or vapors and of the liquid is also concurrent, and downwardly, and that separate paths for the liquid and gases or vapors are provided at those points where they are not in contact. The advantage of the tower just described is that there is assurance that the gases or vapors will not short-circuit from one section to the other. The construction of the trap plates prevents it, as the gases or vapors find it much easier to travel downwardly through the contact plates and upwardly through the passageways provided for them. The openings 309 in the topmost distributing plate 306 are really slots, as can best be seen from Fig. 14. As the gas can find no outlet from the space 310 above plate 306, it must pass through the uppermost set of contact plates 301, 302 and 303 to get to the outlet 308. The extension 311 of trap-plate 305 keeps the vapors or gases from re-entering the next lower section.

All of the above-described modifications have this generic feature in common, in that the contact between the gases or vapors, and the liquid, takes place while they are flowing in the same, i. e. concurrent, direction, which in this instance is downwardly. The towers constructed in accordance with the present invention, differ radically from the bubble towers, perforated plate, or baffle towers of the prior art.

I claim:

1. A gas-liquid contact device comprising a tower having a plurality of vertically spaced gas-liquid contact zones therein, a foraminous contact plate extending transversely across each contact zone having perforations therein between about ⅛ and ½ inch in diameter for passing a mixture of gas and liquid downwardly therethrough, means spaced above said plate for introducing liquid and gas to be contacted into each of said zones in commingled relationship onto the upper surface of said plate for distribution thereover, a collecting tray in the lower portion of each zone for collecting liquid separated from gas passed through the contact plate immediately above, means in each zone below said plate for cycling gas separated from said liquid to another contact zone, and means in each zone adjacent said tray for cycling liquid separated from said gas to still another contact zone.

2. A gas-liquid contact device comprising a tower having a plurality of vertically spaced gas-liquid contact zones therein, a foraminous contact plate extending transversely across each contact zone having perforations therein between about ⅛ and ½ inch in diameter for passing a mixture of gas and liquid downwardly therethrough, means spaced above said plate for introducing a dispersed mixture of liquid and gas to be contacted into each of said zones onto the upper surface of said plate for distribution thereover, transversely extending collecting trays in the lower portion of each zone for collecting liquid separated from gas passed through the contact plate immediately above, said collecting trays also serving as partitions defining the contact zones in each tower, means in each zone below said plate for cycling gas separated from said liquid to another contact zone above the contact plate therein, and means in each zone for cycling liquid separated from said gas and collected on said tray to still another contact zone in the dispersed state above the contact plate therein.

3. A gas-liquid contact device which comprises an upright tower, a plurality of spaced liquid-collecting trays extending transversely of said tower defining a plurality of vertically spaced contact zones, a foraminous contact plate extending across each contact zone having perforations therein between about ⅛ and ½ inch in diameter and dividing said zone into an upper gas-liquid mixing section and a lower gas-liquid separating section, means for passing separated gas from a lower section of each contact zone to an upper section of another contact zone, means for discharging separated liquid from a lower section of each contact zone to an upper section of still another contact zone above the contact plate therein, and means in said upper section of each contact zone for dispersing said liquid in the gas discharged thereinto whereby said liquid and said gas are distributed over the upper surface of said plate and intimate contact between the gas and liquid is effected during concurrent passage downwardly through each contact plate.

4. A fractionating device comprising an upright tower, a vapor inlet port adjacent an upper end of said tower, a vapor discharge port adjacent a lower end of said tower, said tower including a plurality of transversely extending spaced liquid traps defining a plurality of contact zones, a transversely extending foraminous contact plate extending across each of said contact zones dividing them into upper gas-liquid mixing sections and lower gas-liquid separating sections, said liquid traps and contact plates being arranged to permit essentially downward travel of gases through said tower successively through said zones and sections, means including a pump for circulating liquid collected on one of said traps from one of said zones to a mixing section of a zone above, and means above said plates for dispersing said circulated liquid directly into said gases in said mixing sections whereby the resulting dispersion is distributed over the upper surface of said plates prior to downward passage therethrough.

5. A gas-liquid contact device which comprises an upright tower, a plurality of spaced liquid-collecting trays extending transversely of said tower defining a plurality of vertically spaced contact zones, a foraminous contact plate extending across each contact zone having perforations therein between about ⅛ and about ½ inch in diameter and dividing said zone into an upper gas-liquid mixing section and a lower gas-liquid separating section, means for passing separated gas through each liquid-collecting tray from a lower section of each contact zone to an upper section of a contact zone thereabove, means for gravity discharge of separated liquid from a lower section of each contact zone to an upper section of a contact zone therebelow above the contact plate therein, and means in the upper section of each contact zone for dispersing said liquid in the gas discharged thereinto whereby said liquid and said gas are distributed over the upper surface of said plate and intimate contact between the gas and liquid is effected during the concurrent passage downwardly through each contact plate.

References Cited in the file of this patent

UNITED STATES PATENTS

| Number | Name | Date |
| --- | --- | --- |
| 516,590 | Convert | Mar. 13, 1894 |
| 815,031 | Newhall | Mar. 13, 1906 |
| 1,314,802 | Hechenblickner | Sept. 2, 1919 |
| 1,803,956 | Bergman | May 5, 1931 |
| 1,867,933 | Wilton | July 19, 1932 |
| 1,945,600 | Coubrough | Feb. 6, 1934 |
| 2,200,580 | Pruss et al. | May 14, 1940 |
| 2,333,193 | Persson et al. | Nov. 2, 1943 |
| 2,470,438 | Jackson et al. | May 17, 1949 |
| 2,497,136 | Patterson | Feb. 14, 1950 |